3,258,531
REMOTE CONTROL DEVICE
Adolf Reindl, Konstanz (Bodensee), and Rainer Mallebrein, Singen, Hohentwiel, Germany, assignors to Telefunken Aktiengesellschaft, Berlin, Germany
Filed Apr. 17, 1961, Ser. No. 103,597
Claims priority, application Germany, Apr. 23, 1960, T 18,266
5 Claims. (Cl. 178—7.2)

The present invention relates to means for remotely controlling the position of a turret for selecting a lens of an operating camera comprising one of at least two television cameras in a system having a common output channel and a camera switching device.

The invention includes a control means having a switch, preferably a detent-maintained push button coordinated with each lens of a selected camera, and detent means including an electromagnetic release which, when the turret drive motor is stopped after selection of the lens position of the appropriate camera, releases the pushed button and immobilizes the control system.

It is the object of this system to provide central switching of the associated cameras capable, for example, of changing focal length in accordance with conditions and events to be photographed, in which system, however, the lens turret of a newly selected camera is not necessarily rotated to select the same lens as the previously operated camera.

Additional objects and advantages of the present invention will become apparent upon consideration of the following description when taken in conjunction with the accompanying drawings in which.

Figure 1:
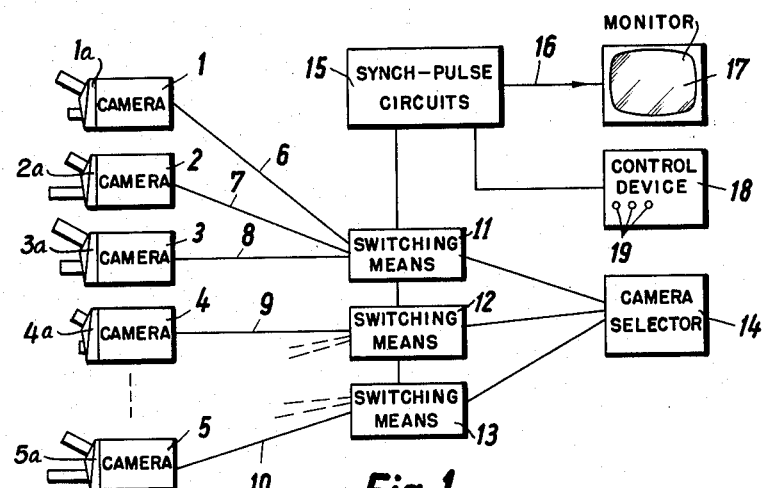
FIGURE 1 is a block diagram showing five cameras and a push-button selection system according to the invention.

FIGURE 1 shows a camera system including several television cameras 1, 2, 3, 4, and 5 whose output signals are connected to switching devices 11, 12, or 13 by cables 6, 7, 8, 9, and 10. The switching means, each of which can be coupled to select one of several cameras, is actuated by a camera selector device 14 in such a way that only the output signal of a selected one of the cameras is transmitted to synch-pulse circuits 15 wherein, among other things, the standard complete television signal is produced and supplied to one or more reproduction monitors 17 through an electric line 16, or, if desired, transmitted through wireless transmission apparatus (not shown).

In addition, a control device 18 is connected with the the pulse circuits 15, which control device serves for the remote control of the lens turrets and, if desired, also of further adjustments, such as diaphragm, focus, etc. The control device 18 includes lens-turret changing switches 19 corresponding with each lens, each preferably comprising a push button that is detent-maintained upon its actuation. Therefore, for controlling a camera with a lens turret, such as the turrets 1a, 2a, 3a, 4a, or 5a, each containing three lenses, three switches 19 are provided at the control device 18 for choosing one of the three possible lenses of the camera presently selected.

During switching of the cameras by the selector 14, it is desirable to prevent selection at a newly selected camera of the lens corresponding to the lens selected at the previously operating camera, and this can be prevented by designing the control device 18 so that the push-button switches 19 are released after each lens position adjustment has been made.

Figure 2:
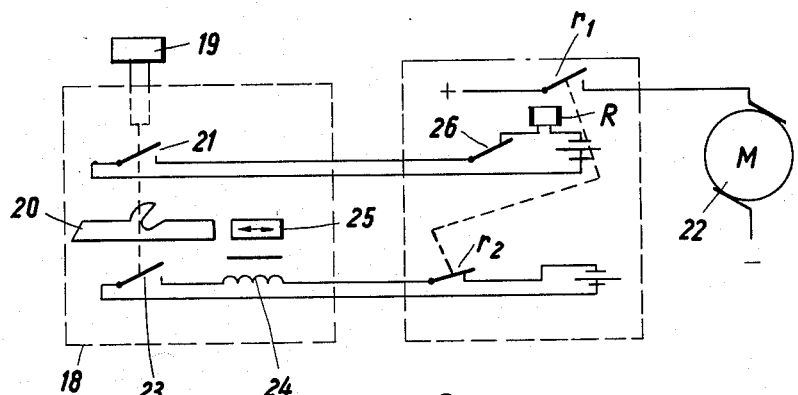
FIGURE 2 is a schematic diagram showing a push button and the associated detent and control means.
Figure 3:
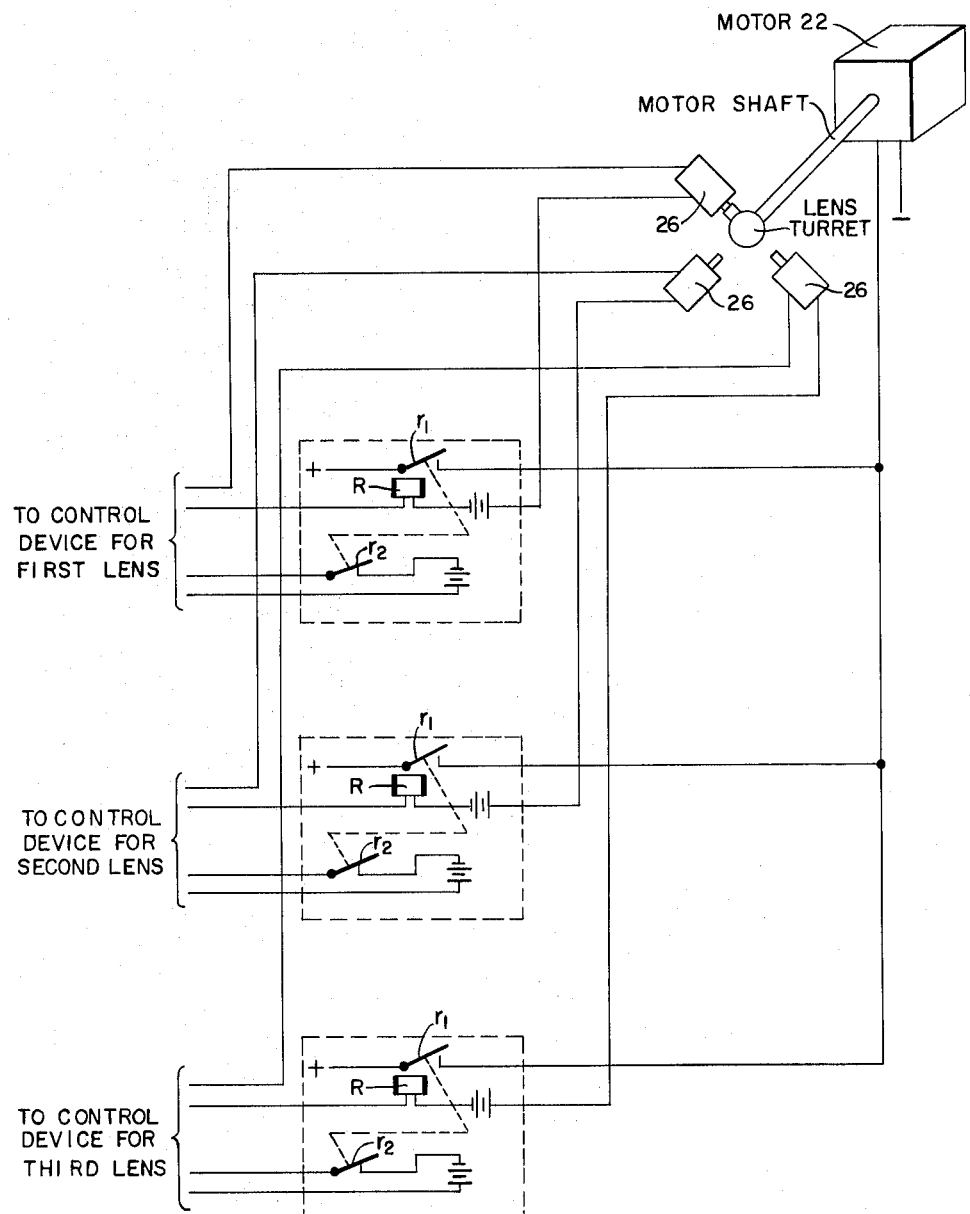
FIGURE 3 is a diagram illustrating the circuit details of the switching means directly associated with the camera, and illustrating the relationship of the lens turret and the switches.

FIGURES 2 and 3 show in greater detail an embodiment wherein the switches 19 of the control device 18 are designed as push buttons which upon actuation are held by a detent device 20. When the button 19 is pushed, it closes the circuit of the winding of the corresponding relay R by closing a contact 21. The excitation of one of the relays R closes the corresponding contact $r_1$ in the circuit of a motor 22, thereby exciting the motor and rotating the lens turret. In addition, the energized relay R opens the corresponding normally closed contact $r_2$ which is serially connected with a further normally open contact 23, which is closed by actuation of the push button 19 to energize the winding 24 of the magnet 25. The electromagnet 25 is arranged in such a way as to displace, when excited, a detent latch 20 thereby releasing again the push button 19. The winding 24 is excited as soon as a remote contact 26, located at the lens turrent of the camera, is opened by completion of the turret position change. When this happens the circuit of the energized relay winding R is interrupted, thereby opening the corresponding contact $r_1$ to stop the motor and closing the corresponding contact $r_2$ to excite the magnet winding 24. When the push button 19 is released by the latch 20, the contact 23 is opened again, thereby interrupting the circuit of the winding 24 of the magnet 25.

It will be understood that the above description of the present invention is susceptible to various modifications, changes, and adaptations, and the same are intended to be comprehended within the meaning and range of equivalents of the appended claims.

What is claimed is:

1. In a television system having a plurality of cameras each including a multiple-lens turret driven by a motor to select a particular lens and the system having an output channel, camera and lens control means comprising, in combination: camera switching means coupled between said cameras and said channel; control means connected to said switching means for selecting one camera to be connected by the switching means to said channel; and turret-control means coupled through said switching means with the particular camera selected and controlling the motor therein, said turret-control means having one control button corresponding with each lens carried on a turret, means for retaining the selection of a button when actuated, and means for releasing said selection when the motor completes rotation of the turret to the selected lens.

2. In control means as set forth in claim 1, said control buttons comprising push buttons and said retaining means comprising detents coupled to maintain a button in pushed position, relay means controlled by said buttons and having contacts controlling said motor; means to immobilize the relay means when the selected lens is in position; electromagnetic means for releasing the detents; and contact means on the relay means and coupled to the electromagnetic means to actuate the latter and release the detents when the relay means is immobilized.

3. In control means as set forth in claim 2, each push button having first contact means for activating the relay means and having second contact means connected in series with the relay contact means coupled to the electromagnetic release means, the second contact means opening upon release of the detent to de-energize the electromagnetic means.

4. In control means as set forth in claim 2, said means to immobilize the relay means comprising a normally closed switch at the selected turret and connected in series with said relay means, said switch being opened by the turret upon completion of the lens selection to open the contacts controlling the motor.

5. Apparatus for remotely controlling the lens change of at least two television cameras connected with a common output circuit by way of a switching means, said apparatus comprising, in combination: an objective positioning motor; a plurality of switch members associated with respective lenses of the particular camera which is connected to the output circuit; and a plurality of detent means associated, respectively, with said switch members for arresting the associated switch member upon actuation thereof, each detent means incorporating electromagnetic means for terminating the immobility of the respective switch member when said motor is stopped.

References Cited by the Examiner
UNITED STATES PATENTS

| | | | |
|---|---|---|---|
| 2,621,241 | 12/1952 | Jensen | 340—162 |
| 2,694,352 | 11/1954 | Babbs | 178—7.92 |
| 2,702,312 | 2/1955 | Rackett | 178—7.2 |
| 2,725,423 | 11/1955 | Graham | 178—7.2 |
| 2,782,253 | 2/1957 | Allanson | 178—7.92 |
| 2,909,761 | 10/1959 | Rockola | 340—162 |

DAVID G. REDINBAUGH, *Primary Examiner.*

ELI J. SAX, *Examiner.*

R. M. HESSIN, J. McHUGH, *Assistant Examiners.*